United States Patent [19]
Couturier

[11] Patent Number: 5,426,724
[45] Date of Patent: Jun. 20, 1995

[54] METHOD FOR INCREASING THE CONTRAST OF A SYNTHETIC IMAGE GENERATOR, AND GENERATOR FOR THE IMPLEMENTATION THEREOF

[75] Inventor: Alain Couturier, Les Essards Le Roi, France

[73] Assignee: Thomson - CSF, Puteaux, France

[21] Appl. No.: 848,305

[22] Filed: Mar. 9, 1992

[30] Foreign Application Priority Data

Mar. 12, 1991 [FR] France ................. 91 02954

[51] Int. Cl.$^6$ ............................................ G06T 5/00
[52] U.S. Cl. ............................. 395/132; 395/131
[58] Field of Search ............... 395/119, 126, 129–132; 351/36; 382/22; 358/29, 78, 108, 461, 168, 169; 348/708, 712, 713

[56] References Cited

U.S. PATENT DOCUMENTS

| | | | |
|---|---|---|---|
| 4,239,351 | 12/1980 | Williams et al. | 351/36 |
| 4,803,736 | 2/1989 | Grossberg et al. | 382/22 |
| 4,885,650 | 8/1989 | Seigneur et al. | 315/383 |
| 5,051,928 | 9/1991 | Gruters | 358/78 X |
| 5,061,997 | 10/1991 | Rea et al. | 358/108 |
| 5,067,098 | 11/1991 | Moellering et al. | 395/126 |
| 5,208,903 | 5/1993 | Curry | 395/131 |
| 5,223,921 | 6/1993 | Haruki et al. | 358/29 |

*Primary Examiner*—Almis R. Jankus
*Attorney, Agent, or Firm*—Oblon, Spivak, McClelland, Maier, & Neustadt

[57] ABSTRACT

In order to improve the contrast of a synthetic image generator, the usually implemented operations of luminance compression are eliminated. Instead, a computation of true luminosity is made and the function of adaptation of the eye is included by computing the true output light energy. Then, the video components of the signal are sent to a display system and are standardized as a function of the light energy of the image displayed and the possible range of the image display. The method includes producing images with a luminance range substantially equal to the true luminance range of an eye and sending this signal to the display system. The signal is varied for different images at a time equal to the time an eye adjusts to different images. The apparatus includes a main channel being corrected by a computing circuit, having a peak luminance extraction circuit and a light energy computing circuit for generating a luminance correction signal.

10 Claims, 3 Drawing Sheets

METHOD FOR INCREASING THE CONTRAST OF A SYNTHETIC IMAGE GENERATOR, AND GENERATOR FOR THE IMPLEMENTATION THEREOF

BACKGROUND OF THE INVENTION

The present invention relates to a method for increasing the contrast of a synthetic image generator and to a generator for the implementation of this method.

The images produced by synthetic image generators, such as those used in simulators, in combination especially with devices of the wide field projection type, often show a lack of luminosity or contrast. This is because the image generator system compresses the range of computation of the luminosity values of the image without simulating the natural adaptation of the eye.

An object of the present invention is a method that can be used to increase the contrast of the images produced by a synthetic image generator working in real time, said method being simple to implement and using low-cost means.

Another object of the invention is a generator that implements this method.

SUMMARY OF THE INVENTION

According to the invention, there is provided a method wherein images are produced with a luminance range substantially equal to the true luminance range of the eye, and wherein the image display system is sent a signal, the range of instantaneous luminance of which is substantially equal to the static instantaneous luminance range of the eye. Advantageously, the position of the instantaneous luminance range of said signal varies with a time constant that is substantially equal to that of the eye.

BRIEF DESCRIPTION OF THE DRAWINGS

The present invention shall be understood more clearly from the detailed description of an embodiment, taken as a non-restrictive example and illustrated by the appended drawings, wherein.

MORE DETAILED DESCRIPTION

Figure 1:
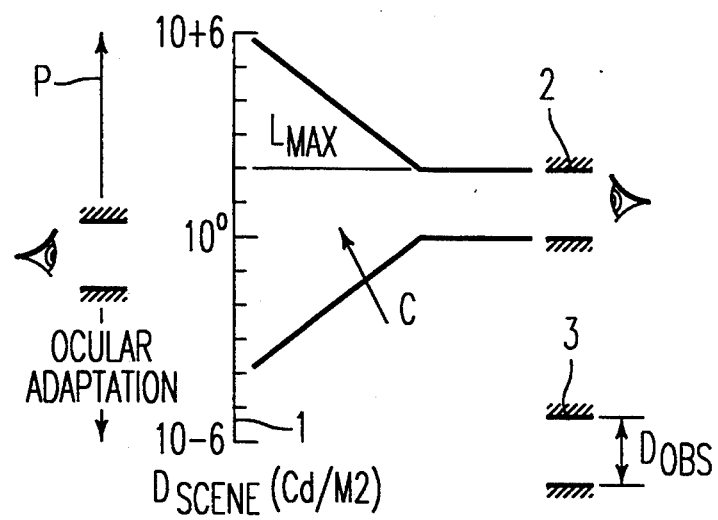
FIGS. 1 and 2 are explanatory diagrams relating respectively to a prior art method and to the method of the invention.

The eye constantly adapts to its light environment. To put it in approximate fashion, it may be said that the process of adaptation by the eye can be summarized by two temporally different parameters.

The first parameter is the static instantaneous range of the eye ($D_{obs}$). This value varies from 100 to 1000. For an average observer, it is about 200 (or 8 bits). This means that for a mean and constant ocular environment, the eye simultaneously perceives luminosities of $L_{max}$ to $L_{max}/200$. It is in this case that the perceived luminosity is the maximum and that the observer experiences a sense of "resolution". This parameter signifies a static observation or one having low mobility. The eye then integrates the energy that it receives, and adapts to this energy.

When the eye shifts or when the lighting conditions change, its sensitivity to the conditions of illumination get modified and bring a second parameter into play: this is its true range ($D_{scene}$), in other words the range of $L_{max}$. In theory, this range is very high and reaches 10 (24 bits), namely a range of luminosity ranging from about $10^{-2}$ lux to $10^{-3}$ lux, corresponding to the limit of appreciation of shapes, up to $10^5$ lux in full sunlight. It is within this field $D_{scene}$ that the window of observation $D_{obs}$ shifts. The motion of translation of $D_{obs}$ is relatively slow and is done after integration of the light. This is the ocular adaptation. A few seconds are needed to make a two-bit shift (for example as in the shift from looking at one's desk and under it) and several seconds are needed to make a 10-bit shift (for example as in the shift from looking at an illuminated desk and then at a distant star)

The eye therefore behaves like a sensor having a capacity, in differential input mode, that is characterized by a range of 200 and a very high pass band, and having a capacity, in common input mode, of $10^7$ and a very low pass band.

During the observation of artificial images, the eye no longer moves or hardly moves, and receives luminous information that is substantially constant and has an $L_{max}$ value that is saturated. There is then little difference between $D_{obs}$ and $D_{scene}$. Images such as these are produced by a domestic television set ($L_{max}$ varies from 3 to 10 $CD/m^2$). In either case, the image display system has a luminance synthesizing capacity of a reduced range and the eye loses its capacity of accomodation to the wide variations in luminance. It could work only with its static instantaneous range which will most usually be limited by the contrast in the display of images (from 10 to 200). To have better simulation and optimum contrast, the adapting of the eye to the major variations of $L_{max}$ (source) would have to be done upline, namely within the image generator.

In everyday television, this adjusting operation differs according to the type of image processing. At source, it is the cameraman who corrects his shot by filters, by using his iris or by providing added lighting. Subsequently, as and when the video processing operations go ahead, it is either other operators (editors, mixers) or automated systems (AGC) who control and maintain these corrections. This means that when a video disk, a video tape-recorder or again a simple domestic television reception antenna is used, the video signal has a standardized amplitude. Its peak value is constant. In all these devices, when one looks at the sun or turns one's back to it, when a sheet of paper is read by daytime or with a night lamp, the image appears to have the same quality. However, at the start of the scene or of the shooting, the illumination values for a same perceived white would differ by ratios of over 100. The vision control supervisor, the iris of the cameraman's lens or the AGC of the recorder have corrected these variations so that, at output of the control room, the video signal of the white is always at 700 mV and that of the black is always at 50 mV, give or take a few shades. This naturally does not mean that all the images will resemble each other. Within this range, the distribution of the signal may be different. It is used to provide information on the conditions of the scene. If it is desired to introduce shades into an effect like a dark night or a dazzling light, then the scene is artificially tinged with blue or yellow, and the distribution of its contrast is modified by hand. But, in almost every case, the video signal remains standardized.

In the generation of synthetic images and in simulation, the problem is different from that of commercial television inasmuch as there is no longer a human operator. The video signal is the result no longer of a measurement but of a computation. This computation is done on the basis of equations to which different corrections are made in order to replace certain parameters that are impossible to compute in real time. This is the case with "radiosity", a term that covers inter alia the contributions of computation of scattering in the atmosphere and of the inter-facet reflections, simply simulated by a constant term of "ambient luminosity".

The basic problem with this computation is that it does not depend on the direction looked at and the integration of the eye, and that, since there is no operator to correct it in real time, there is no chance of its being "ocularly adapted".

Thus, to change to the 8-bit video format, a luminance whose range extends from sunlight to penumbra, the computation is the object of different compressions that limit, in principle, its excursion and contrast. It is because these processing operations are fixed, empirical to a certain extent and dependent on the system of image display on which they have been devised that the image is sometimes good and sometimes poor.

The diagram of FIG. 1 shows a logarithmic scale, referenced 1, to its left, the limits in $Cd/m^2$ of the true range ($D_{scene}$) of an observer's eye (to the left) taken in reality. To the right, at 2, there is shown the range obtained after compression (C) in a synthetic image generator (to be expressed in 8 bits, i.e. in a ratio of 1 to 256). The range 2 corresponds to the range 3 ($D_{obs}$) which is the static instantaneous range of an observer's eye.

Figure 2:
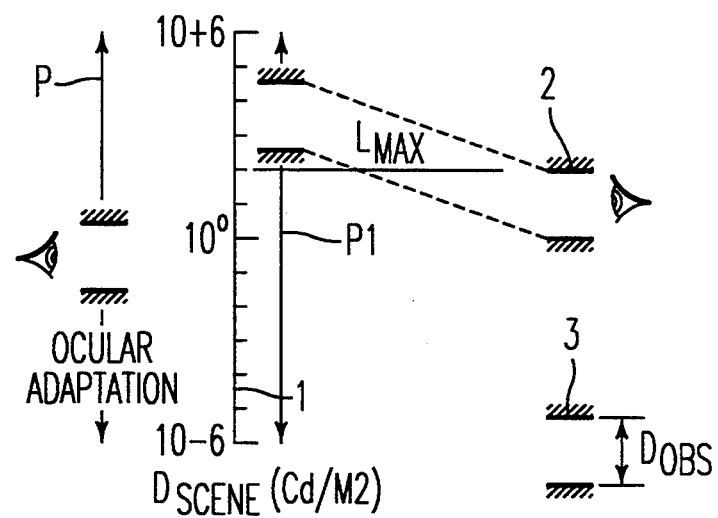

According to the invention, and as illustrated schematically in FIG. 2, the accomodation of the eye to the variations in luminance of a scene are synthesized in the output processor of the synthetic image generator. The implementation of this method is expressed by the addition of an automatic diaphragm which is generally a multichannel diaphragm. Thus, the visual display system is adapted according to a criterion of observation (peak value or energy of a signal) so as to produce an image, the content of which is always adjusted with the maximum contrast, i.e. the range in which $D_{obs}$ is shifted is equal to the maximum range of the image generation system. To achieve this, the luminance compressions that are usually active in the present systems (compressions relating to the offset values, values of saturation of variables etc.) are eliminated. Then, a computation of true luminosity is done, preferably with a computer working with a floating decimal point (to ensure the maximum range, for example a range of less than 24 bits). Then, the adapting function of the eye is included in the processing program of the synthetic image generator. Finally, the correction signal resulting from the above-mentioned steps is weighted by specific additional corrections such as the energy content of other windows of the visual display system and external elements of information relating to dictated values (for night or twilight scenes, or for meteorological conditions etc.). The function of adaptation of the eye is obtained by computing the true light energy at output of the generator and then by integrating this energy as a function of the time and/or of the distributions of peak values, and then the standardization of the video output components as a function of the image energy and of the possible range of the image display system.

FIG. 2 gives a view, at 1' on a logarithmically graduated scale, of the true range $D_{scene}$ with, to the left, the range P of ocular adaptation (from $10^5$ to $10^{-6}$ $Cd/m^2$ approximately) and, to the right, the range P1 of adaptation of the synthetic image generator provided with the device of the invention (P1 is substantially equal to P) with a "window" F that shifts throughout the zone P1, the range of this window F being practically equal to the static instantaneous range $D_{obs}$ of the observer's eye.

Figure 3:
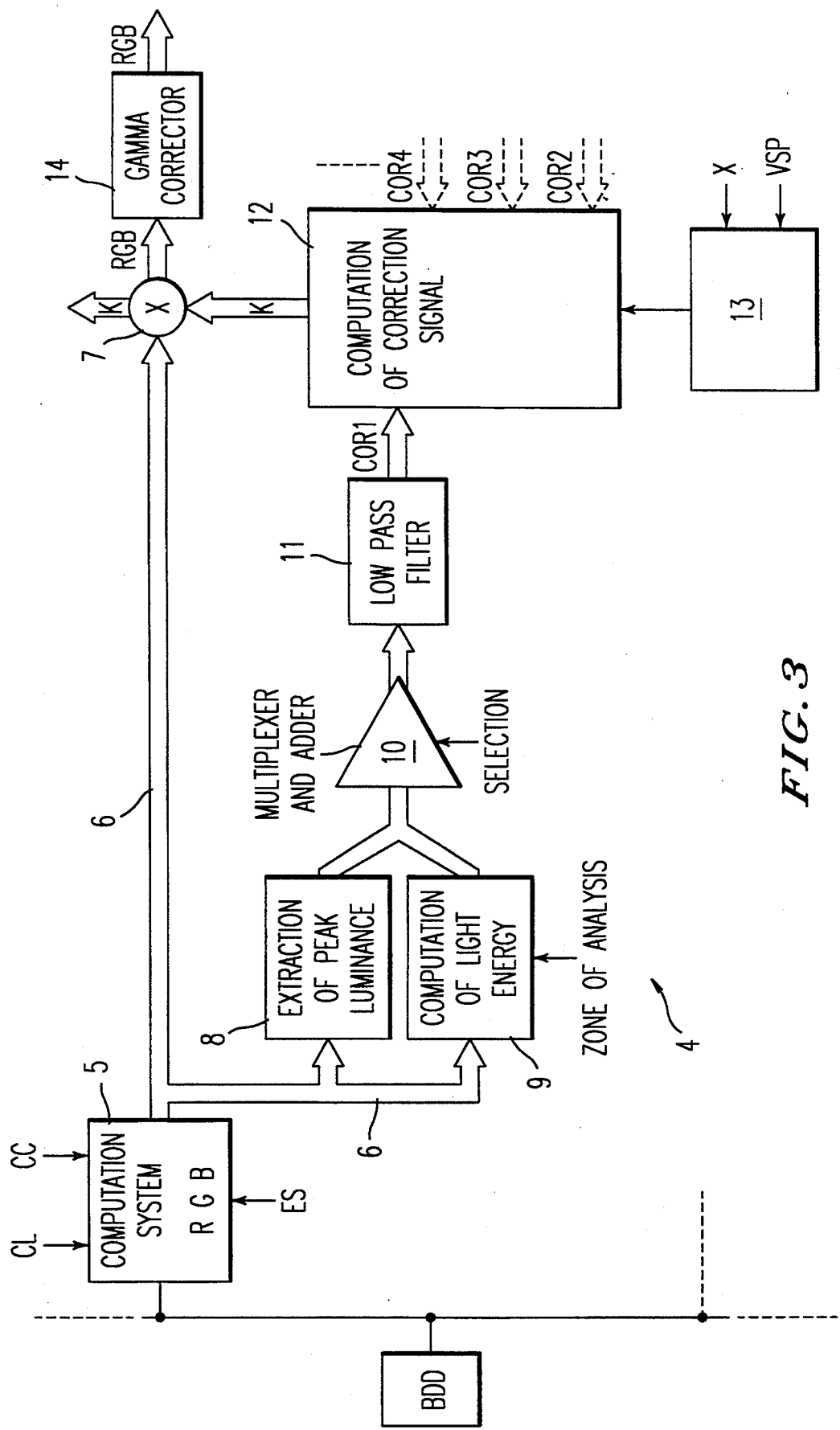
FIG. 3 is a block diagram of a synthetic image generator according to the invention.

FIG. 3 shows a block diagram of a computation channel 4 of the synthetic image generator, according to the invention. This channel 4 is connected, as are all the other similar channels (not shown), to a central data bank BDD. Each channel is connected to its own display device (such as one of the devices 15a to 15d described here below with reference to FIG. 4). This channel 4 has a computer 5 to compute the primary values (RGB), on the basis of the following: information elements CL relating to luminosity components of the different channels of the image, colorimetrical components CC relating to surfaces and information elements ES relating to special effects (textures, fog, intense light sources etc.). These special effects can be best simulated by carrying out the integration of luminance according to criteria relating to fields or luminous distributions, for example a criterion of integration on the totality of the field or a criterion based on the measurement of the peak white value. The output bus 6 of the computer 5 is connected, firstly, to a multiplier 7 and, secondly, to a peak luminance extraction circuit 8 (making it possible to determine dazzling, if any, when the peak values go beyond a determined level) and to a circuit 9 to compute the light energy of the images before correction (making it possible to carry out weighting operations similar to the reactions of the eye) receiving an information element relating to the zone of analysis. The ciruits 8 and 9 are followed by a multiplexer-adder 10 and a low-pass filter 11, the function of which is to simulate the time constant of accomodation of the eye. The output signal of the filter 11 is sent, as a first correction signal (COR1), to a circuit 12 to compute the correction signal which, furthermore, receives other correction signals COR2, COR3, COR4, etc. These correction signals are given by said other channels similar to the channel 4. The circuit 12 is connected to another computer 13 to compute the correction as a function of the setting value X chosen on the basis of the characteristics of mean contrast proper to the image display system. The value of X may range, for example, from 5 to 8 bits as a function of the image display system used. The setting correction is done on the luminance alone, and slowly (to simulate the reaction time of the eye). The circuit 12 also receives an information element VSP on vision: namely scotopic (or night) vision or photopic (or daytime) vision. The circuits 12 and 13 are common to all the channels.

Figure 4:
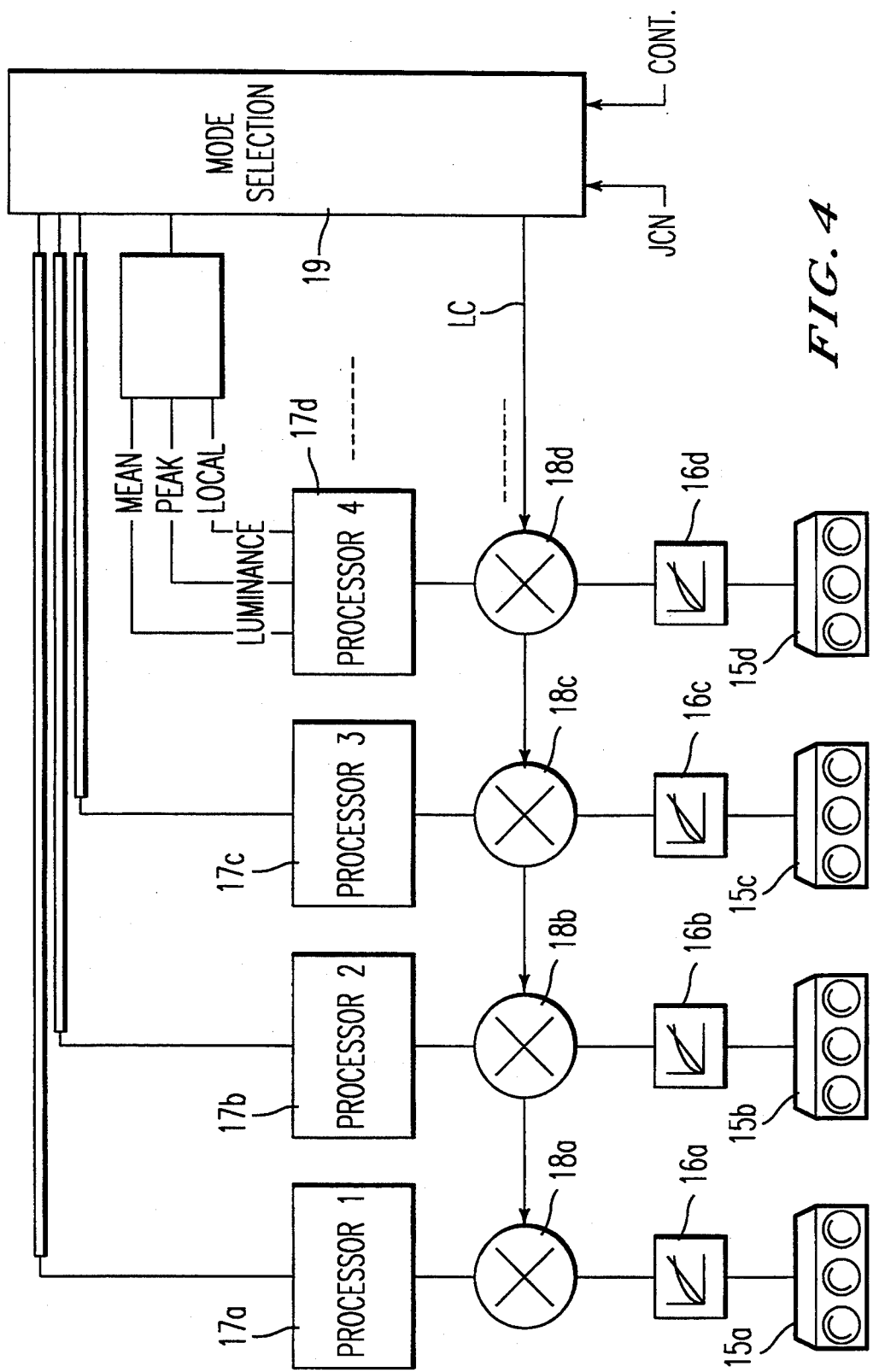
FIG. 4 is a block diagram of a synthetic image generator according to the invention, capable of being used in a multiple-window system.

The circuit 7 transmits the common correction signal K (preferably relating to the components R, G, B) prepared by the circuit 12 to the other video processors of the system, each relating to a display system and shown in FIG. 4.

The circuit 7 also transmits the signal from the bus 6, corrected by the corrections K prepared by the circuit 12, in RGB form through a linearity correction ("gamma" correction) circuit 14 optional to the image display device (not shown). This display device thus receives a signal with a low static instantaneous range, this range being capable of shifting, with a time constant close to that of the eye (by means of the filter 11) throughout the possible range (from $10^{-6}$ to $10^{-5}$ Cd/m$^2$ approximately).

It will be noted that at least a part of the video computation on the luminance can be done outside the synthetic image generator, for example in the central computer of the simulator, the latter then sending a common correction signal to all the channels of the image generator. It is thus possible to simplify the information exchanges between these different channels.

FIG. 4 gives a schematic view of a visual display system with several channels for the production of images. This visual display system includes several image display devices 15a, 15b, 15c, 15d, ... which, in the present case, are trichromatic projectors. Each of them is preceded by a linearity correction ("gamma" correction) circuit 16a, 16b, 16c, 16d, ... respectively. Each channel has its own video processor 17a, 17b, 17c, 17d, ... connected to the corresponding circuit 16i (i=a, b, c, d, ... ) by a multiplier 18a, 18b, 18c, 18d, ... . The different processors 17i are controlled by a mode selection circuit 19 (mean, peak or local luminance) receiving information elements (cont) relating to the desired contrast and information elements JCN on the general conditions of illumination (day, night or twilight). The circuit 19 sends the circuits 18i a luminance and chrominance signal LC.

In this multiple-window visual display system, the criterion of integration simulating the eye is taken at one of the processors and sent to all the other processors, in such a way as to guarantee the homogeneity of the visual display system. The selection of the luminance reference channel may be done, for example, by choosing, from among the maximum white values of the different windows, the one having the highest peak value or else the luminance of a predetermined fixed window (for example the central window) or else the window located in the axis of observation of the user (in advantageously using a device to detect the position of the user's head) or the highest value from among the mean luminance values of the different windows.

The device of the invention enables an overall correction of the image displayed. Thus for example if, on one of the channels (or part of the displayed image), a dazzling surface appears (powerful beacon, sunlight etc) while the luminance of the other channels has a mean value, then it is not possible to increase the luminance sufficiently to restore this dazzle (the image display system soon reaches saturation in luminance) and, according to the invention, the luminance of all the other channels (the action of the circuit 13) is diminished while at the same time increasing the luminance of the dazzle-affected channel up to its maximum possible value.

What is claimed is:

1. A synthetic image generator producing synthetic images corresponding to actual images obtained from a video input and having improved contrast, comprising: a main channel without luminance compression; and a correction computing circuit adjusting luminosity of the main channel according to a luminance range perceived by an eye observing the actual images, wherein the correction computing circuit includes a peak luminance extraction circuit and a light energy computing circuit.

2. A generator according to claim 1, wherein the correction computing circuit includes a low-pass filter.

3. A method to improve contrast of an actual image obtained from a video input processed by a synthetic image generator, comprising the steps of:
processing said actual image to obtain an improved contrast synthetic image having a luminance range equal to a luminance range perceived by an eye observing the actual image; and
sending an image display signal representing an instantaneous luminance range of the actual image to an image display system, the image display signal being equal to a static luminance range of the eye when it observes static images, wherein the image display system varies the instantaneous luminance range with time at a rate no greater than the rate at which the eye adjusts to different luminances.

4. A method according to claim 3, applied to a multichannel display system, wherein all channels are each sent a control signal the instantaneous luminance range.

5. A method according to claim 3, wherein said control signal is taken at one of the channels serving as a reference channel.

6. A method according to claim 3, wherein the reference channel is chosen as a function of criteria selected from the group consisting of: maximum peak value of white, predetermined fixed channel, channel corresponding to the axis of observation of the eye, and a greater mean value of luminosity.

7. A method to improve contrast of an actual image obtained from a video input processed by a synthetic image generator, comprising the steps of:
computing data of an image stored in a central data bank using a computation system which processes the data of the image on the basis of information elements relating to luminosity components of different channels of the image, colorimetrical components with relating to surface information and special effects elements, the computation system outputting a computed output signal;
extracting a peak luminance from the computed output signal using a peak luminance extraction circuit;
computing light energy from the computed output signal using a light energy computation circuit;
producing a first correction signal based on the computed output signal, the peak luminance and the light energy;
computing correction signals including the first correction signal and other correction signals corresponding to other channels of the image, for producing a common correction signal on the basis of mean contrast characteristics of the synthetic image generator and an information element corresponding to scotopic and photopic vision characteristics, the common correction signal correcting luminance of the image; and
simulating a rate for computing the correction signals no greater than a rate at which an eye accommodates to changes in luminance;
combining the common correction signal with the computation output signal to provide a corrected output signal representing the synthetic image with proper luminance.

8. A method according to claim 7, further comprising the steps of:
gamma correcting the corrected output signal; and sending the correction signal (K) to other video processors for computation of a correction signal on other channels.

9. A method according to claim 7, wherein the simulating step is performed by a multiplexer-adder followed by a low-pass filter.

10. A synthetic image generator improving the contrast of an actual image obtained from a video input, comprising:

a mode selection circuit for selecting between mean, peak and local luminance modes, and for outputting a luminance and chrominance signal (LC) based on information elements relating to the desired contrast (CONT) and information elements on the general conditions of illumination (JCN);

a plurality of processors in parallel receiving a selected mode from the mode selection circuit, each processor processing image data for different channels, for a processing image data on a channel; and multipliers receiving the luminance and chrominance signal (LC), each of the multipliers receiving an output signal from one of the processors and combining the output signal with the luminance and chrominance signal (LC) for simulating the criterion of integration of an eye, such that a contrast on any one channel does not cause different channels to lose contrast.

* * * * *